(12) United States Patent
Homchaudhuri

(10) Patent No.: US 7,676,214 B2
(45) Date of Patent: Mar. 9, 2010

(54) METHOD AND SYSTEM FOR INCREASING THE STANDBY BATTERY LIFE OF A MOBILE DEVICE

(75) Inventor: Sandip Homchaudhuri, Karnataka (IN)

(73) Assignee: Samsung Electronics Co., Ltd (KR)

( * ) Notice: Subject to any disclaimer, the term of this patent is extended or adjusted under 35 U.S.C. 154(b) by 550 days.

(21) Appl. No.: 11/710,697

(22) Filed: Feb. 26, 2007

(65) Prior Publication Data

US 2007/0259699 A1  Nov. 8, 2007

(30) Foreign Application Priority Data

Feb. 24, 2006  (IN) .......................... 315/CHE/2006
Feb. 16, 2007  (KR) ...................... 10-2007-0016829

(51) Int. Cl.
*H04B 1/16* (2006.01)
*H04M 1/00* (2006.01)

(52) U.S. Cl. .................................. 455/343.1; 455/574

(58) Field of Classification Search .................. 455/574, 455/127, 67.7, 226.1, 159.2, 572, 67.13, 455/550.1, 115.3, 114.2, 38.3; 340/7.32, 340/539.3, 855.8; 315/151; 318/114; 320/137
See application file for complete search history.

(56) References Cited

U.S. PATENT DOCUMENTS

| | | | | |
|---|---|---|---|---|
| 5,799,256 A * | 8/1998 | Pombo et al. | ................ | 455/574 |
| 5,845,190 A * | 12/1998 | Bushue et al. | ............... | 725/130 |
| 5,864,221 A * | 1/1999 | Downs et al. | ................ | 320/134 |
| 5,994,855 A * | 11/1999 | Lundell et al. | ............... | 318/114 |
| 6,263,200 B1 * | 7/2001 | Fujimoto | ................. | 455/343.5 |
| 6,628,972 B1 | 9/2003 | Lee | | |
| 2002/0132603 A1 * | 9/2002 | Lindskog et al. | ............ | 455/343 |

* cited by examiner

*Primary Examiner*—Melody Mehrpour
(74) *Attorney, Agent, or Firm*—The Farrell Law Firm, LLP

(57) ABSTRACT

A method and system for increasing the standby battery life of a GSM mobile device. The method increases the standby battery life of a GSM mobile device by reducing monitoring of the serving cell's paging messages using a deterministic and adaptive procedure with zero impact on call performance, where the procedure reduces the frequency of reception of valid paging messages, intended for the device in the Paging Channel, by lengthening paging-read interval.

21 Claims, 5 Drawing Sheets

METHOD AND SYSTEM FOR INCREASING THE STANDBY BATTERY LIFE OF A MOBILE DEVICE

PRIORITY

This application claims the benefit under 35 U.S.C. §119(a) of an application filed in the Indian Patent Office on Feb. 24, 2006 and assigned Serial No. 315/CHE/2006 and an application filed in the Korean Intellectual Property Office on Feb. 16, 2007 and assigned Serial No. 2007-0016829, the contents of each of which are incorporated herein by reference.

BACKGROUND OF THE INVENTION

1. Field of the Invention

The present invention relates to a mobile device, and more particularly to a method and system for increasing the standby battery life of a Global System for Mobile Communication (GSM) mobile device.

2. Description of the Related Art

Since the invention of the first wireless cellular phone, cellular-technology has become the preferred standard for portable wireless communication system across the world. A cellular communications system is usually represented as a honeycombed structure, as indicated in FIG. 1 showing a conventional GSM cellular system. The conventional GSM cellular system includes a plurality of cells 10. Each cell 10 includes a Base Transceiver Station (BTS) 20 equipped with a Radio Transmitter and a Radio Receiver. Each such cell 10 has a range of service over which it caters to a plurality of stationary or roaming mobile units 30. However, a particular mobile unit gets serviced by a unique cell or BTS, as would be evident to anyone skilled at the related art. The same has been indicated in the FIG. 1. It would be apparent to those skilled in the related art that only those aspects of the BTS which are germane to the present invention has been elucidated in FIG. 1, omitting all the other irrelevant intricacies.

An idle-mode process of a mobile unit can be generically described as follows:

1: Looking out for notifications, a.k.a. paging messages, from the Network indicating an incoming call or a short message by reading information out of a Paging Channel (PCH);

2: Gathering the received signal strength, known in the prior art as Received Signal Strength Indication (RSSI), of the serving cell;

3: Scanning the plurality of neighboring cells, surrounding the mobile unit, and gathering the RSSI for each of them; and 4: Evaluating if there is/are any neighbor cell/cells which has/have a higher RSSI compared to the serving cell's RSSI and then making a reselection to a neighboring cell having the greatest RSSI, among the plurality of neighbor cells having higher RSSI than the serving cell, at certain timing. Once reselected, the steps 1 through 4 are repeated in the new cell.

The quality with which the mobile unit is able to meet the first objective of the idle-mode behavior determines the service quality of the cell for that particular mobile unit. A mobile unit is considered to be having good service quality from the serving cell if it is able to decode the network (NW)-transmitted information on the PCH without too many failures.

The battery of a mobile unit is significantly consumed in the process of tuning a Radio Frequency (RF) unit and receiving data from the downlink beacon frequency, and thereby the standby time of the battery is reduced. Accordingly, the average standby time of a mobile unit according to the above four steps 1 through 4 can be expressed as follows:

Standby Time(in hours)=[(Battery Capacity in milli-ampere-hours)/(Average Current consumed in milli-ampere)]

From wireless communication protocols, the chief contributing cause to this average current consumption is the operation of the RF unit to monitor, read and/or scan the radio frequencies to achieve the above four idle-mode goals. The operation of an RF unit in the idle mode can be summarized as follows:

RF unit activity in idle mode=RF reception on the serving cell's PCH data blocks and gathering RSSI of the same+RF scanning of the neighbor cell's radio frequency to obtain the respective RSSIs.

In light of the above summary, it is apparent that any battery conservation needs to be done by optimizing one or both of the above two factors.

Work done in the prior art has indicated several ways to optimize on the aspect of neighbor cell scanning by reducing the rate at which the neighbor cells are scanned based on certain factors and thereby reducing the use of the RF unit, and hence the current consumption, over a period of time.

A mobile unit monitors its own PCH periodically to look out for any instance of an incoming call. It is network's responsibility to forward the notification of an incoming call to the mobile unit and the network achieves the same by sending the notification of PCH along with the notification of the incoming call, as a paging message, at pre-determined locations in the PCH of which the mobile unit is also aware. A mobile unit knows, in advance, the locations in the PCH where the NW would send the notification for an incoming call. The location or the scheduling of the notification in the PCH is determined in advance and agreed upon between the NW and the mobile unit. The mobile unit evaluates the scheduling period autonomously by making use of certain standard network parameters like BS_PA_MFRMS, a paging period parameter in GSM, and Slot Cycle Index (SCI), in Code Division Multiple Access (CDMA).

Since an incoming call to a mobile unit can arrive practically anytime, the mobile unit reads the data sent in the PCH, at its pre-determined intervals, every time to check if there is an incoming call intended for it. Furthermore, since the wireless communication system does not wish to have poor call performance for a mobile unit, it imposes strict rules on the reception of the paging messages in the PCH. FIG. 2 shows a configuration of multiframes of a conventional GSM downlink. As shown in FIG. 2, a bundle of five multiframes 61, 63, 65, 67 and 69 are periodically repeated. The downlink Broadcast Control Channel (BCCH) carrier (or the beacon frequency) of a GSM cell, which constitutes each multiframe, carries the paging information in the Paging Channels, e.g. PCH 1, PCH 2, PCH 3, . . . , etc. The multiframes become Discontinuous Reception (DRX), where a mobile unit determines the periodic interval when it needs to read the data off the PCH. When a mobile unit does not read the PCH, it shuts down its RF unit and attempts to save battery life. This periodic interval is decided upon by the parameter BS_PA_MFRMS, in GSM, and the mobile units read the PCH data periodically.

FIG. 2 shows a scenario where the NW had used a BS_PA_MFRMS of 5. The mobile units are apprised of the same and they wake up periodically to read the respective paging messages. In the parlance of CDMA, this DRX is replaced with the concept of Slot Cycle Index (SCI). Referring to FIG. 2, it may be known that the mobile unit reads off its own paging message data from the PCH block 2, indicated by PCH2, present on the 0th multi-frame among the bundle of five multiframes periodically repeated. Following that, the mobile unit interrupts the operation of the RF unit 95 for all the PCH blocks occurring in the 1st, 2nd, 3rd and 4th multi-frame 63, 65, 67 and 69. The mobile unit subsequently reads the next instance of paging message from the PCH block 2 once again present on the 5th multi-frame 71, and can identify an incoming call through the paging message. If there is a notification of an incoming call, the mobile unit prepares itself for the call and starts a dedicated connection with the NW. If not, the mobile unit discards the paging message and awaits the next instance of the paging message.

Whenever there is an incoming call for a mobile unit, the NW sends the notification of the incoming call to the mobile unit by paging the mobile unit, using its identity, inside the appropriate PCH block. The mobile unit is expected to listen to all instances of its appropriate periodic paging message and respond to the incoming call. However, it is not guaranteed that the mobile unit will be able to decode a particular paging message, containing the notification of the incoming call, in the very first attempt. The NW, therefore, sends the incoming call notification to the mobile unit once again in the next periodic interval. Typically, the NW sends the notification for that single incoming call to the mobile unit a maximum of K times before giving up. The number of notifications of the incoming call greater than a maximum of K times refers to a maximum number of paging repeats. The value of MAX_PAGE_REPEAT_FACTOR is dependent on the NW and varies from NW to NW.

U.S. Pat. No. 6,628,972 B1, issued Sep. 30, 2003, discloses a method of lengthening the Slot Cycle Index (SCI) of a CDMA based mobile unit in order to read the paging messages in the PCH messages. If the method of U.S. Pat. No. 6,628,972 B1 is mapped to the domain of GSM, it can lengthen the DRX period whereby the mobile unit will skip its assigned PCH read intervals, as indicated by BS_PA_MFRMS, and, instead, read its paging messages alternately or an integral multiple of BS_PA_MFRMS. Skipping the valid PCH reads alternately will reduce battery usage nearly fifty percent. Skipping more will further reduce battery usage. But the scheme proposed by U.S. Pat. No. 6,628,972 B1 has problems including a) an un-deterministic approach which can result in poor Mobile Terminal (MT)-paging performance with frequent paging misses and b) a non-adaptive approach resulting in higher probability of missing MT-paging in a sub-optimal signal condition area, where one may not be able afford missing even one paging message.

The prior art, as exemplified by U.S. Pat. No. 6,628,972 B1, introduces the concept of lengthening the Slot Cycle Index (SCI) or the DRX interval, pertaining to GSM standards, in an arbitrary manner without any deterministic approach. In the prior art, the approach relied on obtaining a time interval from the user of the mobile unit when the user wants to use the mobile phone in a limited manner causes problems. When the time interval starts, the mobile unit increases the SCI or the DRX two times, three times, or 'N' number of times, thereby skipping N successive paging messages which it was supposed to have read as per protocol specifications. The user still expects to receive calls, albeit rarely. Whenever there is an incoming call, the NW sends the paging message, indicating the incoming call, a multiple number of times, ranging from 1 to a deterministic number of times, by a MAX_PAGE_REPEAT_FACTOR. If the SCI or the DRX interval is lengthened to a value of ACTUAL_SKIP_FACTOR and if the ACTUAL_SKIP_FACTOR is greater than a MAX_PAGE_REPEAT_FACTOR, the mobile unit will miss an incoming call as it had skipped all those instances of paging messages containing the incoming call notification when the NW actually notified an incoming call. The prior art technique had made no attempt to factor in this aspect into its procedure thereby yielding a battery saving technique with a severe performance-hit loophole.

There is need for a deterministic range for the selection of the value for the ACTUAL_SKIP_FACTOR, and should not be left to a blind selection. Furthermore, the word "rarely" has a very hazy concept in the technical domain. In this case, there can be just two kinds of expectations of a user: (a) the user expects calls or (b) the user does not expect any calls. If (a) the user expects calls, the mobile unit must ensure that it does not miss an incoming call. If (b) the user does not expect any calls, the mobile unit can go into a deep-sleep mode, as would be apparent to those in the related art, and tremendously enhance battery life. As used herein, when the user is expecting calls "rarely," the user implicitly expects calls and hence, for all practical purposes, falls under the (a) case. Given this expectation, a mobile unit cannot just skip the reading of paging messages in an un-deterministic manner, based on a time interval. Call performance of the mobile unit cannot be compromised.

Additionally, the prior art technique does not suggest any means of determining what the MAX_PAGE_REPEAT_FACTOR can possibly be resulting in a non-deterministic approach. If the mobile unit can get an accurate estimate of the MAX_PAGE_REPEAT_FACTOR, the mobile unit can fine tune its selection of ACTUAL_SKIP_FACTOR value so battery life is saved as long as performance of the mobile unit does not deteriorate. The blind selection of the ACTUAL_SKIP_FACTOR is wrought with severe side-effects, as mentioned in the preceding section. Furthermore, there is no wireless communication system, known in the prior art, which attempts to provide information about the MAX_PAGE_REPEAT_FACTOR to its catered mobile unit. The element of NW-assisted battery saving by transferring the paging repetition factor and the pattern in which the pages would be transmitted is missing in the prior art.

There is yet another important aspect missing in the prior art technique of lengthening the DRX interval or the SCI interval, which makes the approach susceptible to low signal conditions or varying signal conditions thereby resulting in sub-optimal MT-call performance. Presume, for example, that the prior art decides to use an ACTUAL_SKIP_FACTOR of 1. This means that the mobile unit now reads its own valid paging messages alternately. Presume also that the mobile unit is roaming in an area where signal conditions are not good. The mobile unit reads the first paging message and finds out that there is no incoming call for itself. The mobile unit also gets an estimate of the air interface, RSSI and Signal to Noise Ratio (SNR), and found that it is not good. As per techniques in the prior art, the mobile unit blindly skips the next paging message to facilitate the battery saving process. Presume that there was an incoming call at this instant and the NW had sent the notification to the mobile unit on that paging message. The mobile unit could have decoded the paging message at this instant, but it had skipped. The NW would send the notification once again in the subsequent paging message. But as the signal conditions are not good, the mobile unit fails to decode the paging message in this attempt and subsequent ones also. This leads to a miss of an MT call. The prior art techniques, employing blind paging skips, thereby fail to account for deteriorating signal conditions. Such a scenario is not unlikely in the life of a mobile unit, especially when the mobile unit is wandering through a high-interference region.

As described above, no attempt has been made in the prior art technique to intelligently handle a battery-saving procedure when signal conditions became bad or are in a process of deterioration. In such signal conditions, a mobile unit cannot afford to miss a single paging message as it has no guarantee about its success in decoding the subsequent paging messages.

SUMMARY OF THE INVENTION

The present invention provides a method and system for lengthening of a paging-read interval, such that the lengthening process does not make the mobile unit compromise with its call performance by ensuring minimal incoming call misses during the time a battery saving process is running.

The present invention provides a method and system by way of which a mobile unit is able to estimate, with a high degree of accuracy, repetition attempts, of an incoming call notification, which a GSM wireless communication NW is employing; the method or the system is able to execute autonomously and derive the repetition number.

The present invention provides a method and system for deriving a number of times the NW will send notification, for an incoming call, to the mobile unit, to decide how long the paging-read interval can be lengthened without affecting the call performance.

The present invention provides a method and system for lengthening the paging-read interval through a careful analysis of the signal conditions.

The present invention provides a method and system for helping mobile units know an exact incoming-call notification repetition number and a pattern and for satisfying the protocol standards of existing wireless communication systems.

The present invention provides a method and system for increasing standby battery life of a GSM mobile device by reducing monitoring of the serving cell's paging messages using a deterministic and adaptive procedure with minimal impact on call performance.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

The preferred embodiments of the present invention will now be explained with reference to the accompanying drawings. It should be understood however that the disclosed embodiments are mere examples of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

The invention relates to a cellular wireless communication system which implements the principle of paging channels (PCHs) to gain dedicated attention of served mobile units wherein the served mobile units monitor a PCH at regular intervals to watch out for all occasions of the wireless communication system's desire to gain dedicated attention, particularly to receive incoming calls or to receive a short message.

Figure 1:
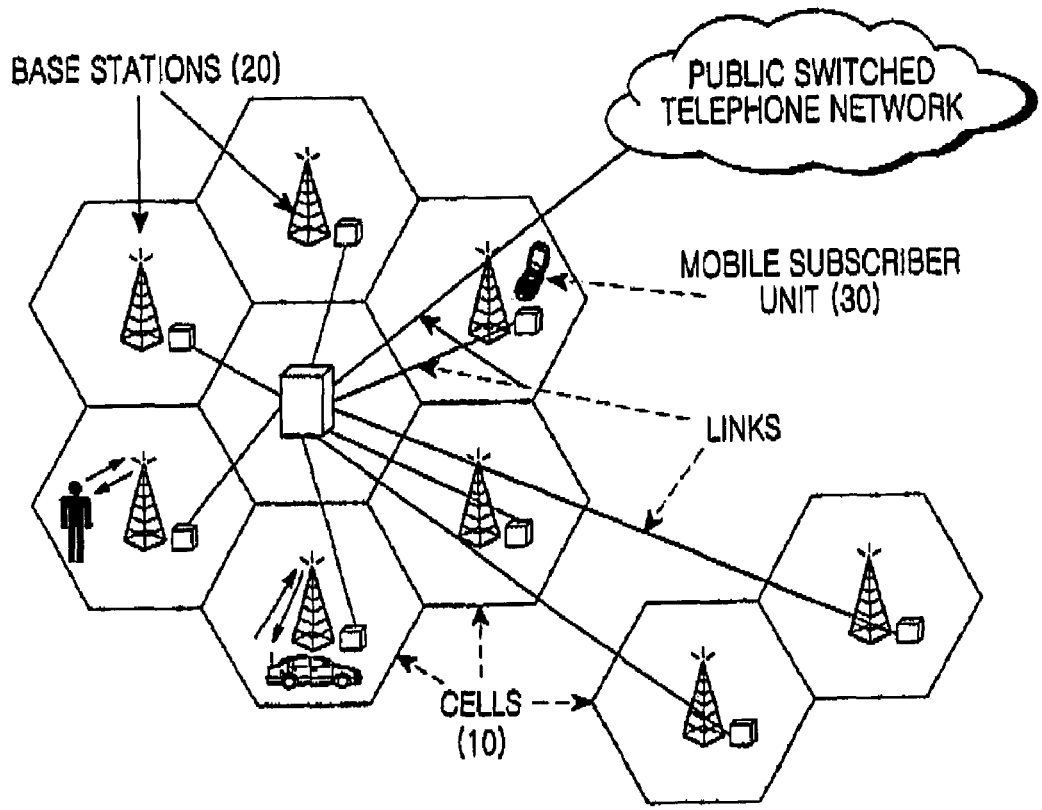
FIG. 1 is a view showing a conventional GSM cellular system.
Figure 2:
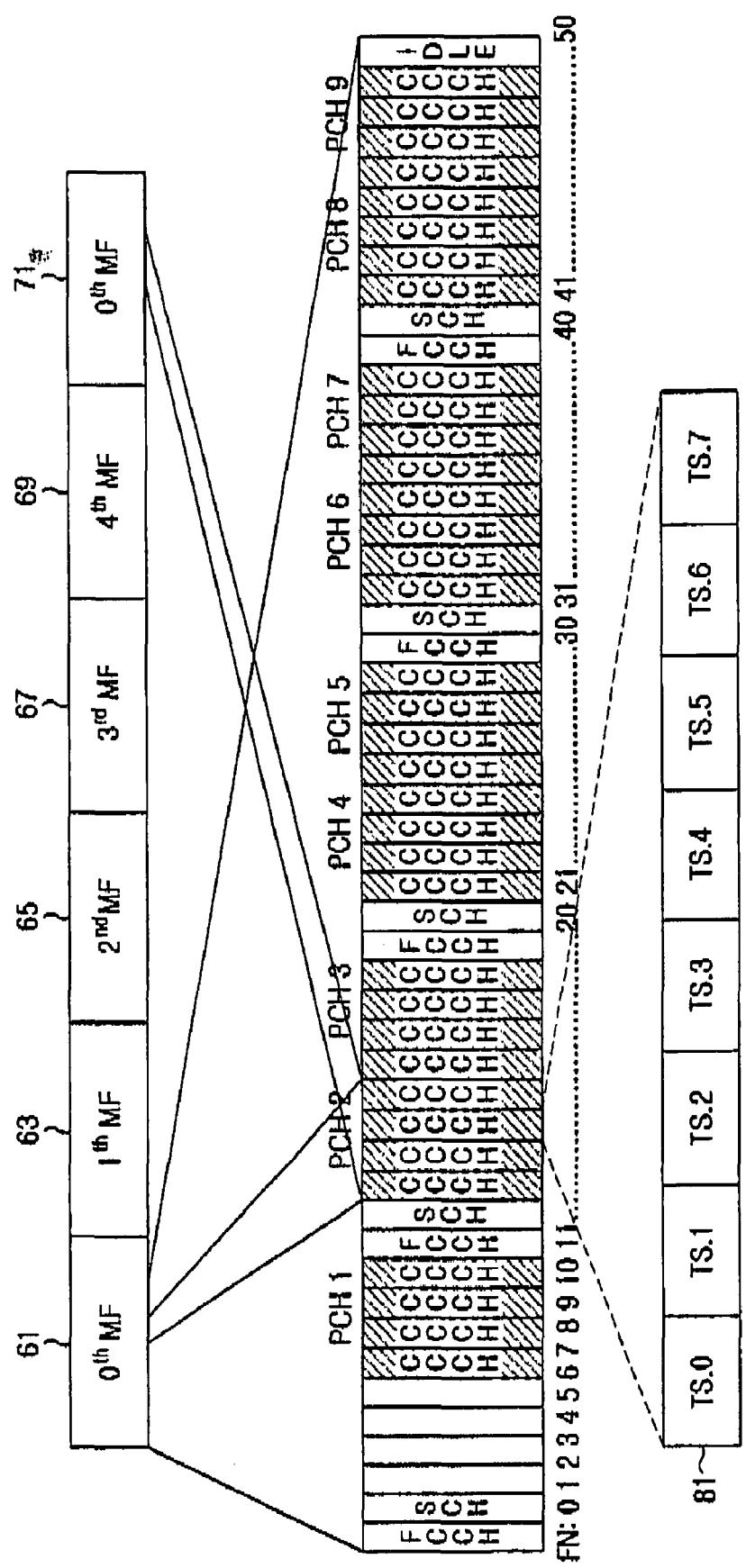
FIG. 2 is a view showing the configuration of a 51-multiframe of a conventional GSM downlink.

As previously described, FIG. 2 shows a typical Time Division Multiple Access (TDMA) based Global System for Mobile Communication (GSM) downlink beacon. Each frame 81 constituting a multiframe is sliced into 8 time-slots. In a GSM system, the downlink beacon is transmitted on the 0th time-slot of the beacon frequency. Respective multiframes 61, 63, 65, 67 and 69 make up a total 51-multiframe structure, where all information is transmitted through the 0th time-slot. The Common Control Channel (CCCH) blocks contain the PCHs. Nine PCH blocks are in a single 51-multiframe structure. A particular mobile unit needs to monitor only one among the nine PCH blocks, the determination of which can be done autonomously inside the mobile unit using well-known equations, as would be apparent to anyone skilled in the related art. FIG. 2 show multiframes transmitted in a paging periodicity interval of five. That is, BS_PA_M-FRMS is five indicating that the paging block for the mobile unit comes after five such 51-multiframes. The mobile unit reads its paging message from the 0th-multiframe 61 and then skips the next four multi-frames 63, 65, 67 and 69 and re-reads the appropriate paging channel block, out of the nine available PCH blocks, in the fifth multi-frame 71. This interval is referred to as the "paging-read interval" hereinafter.

During the remaining time other than a paging-read interval, the mobile unit shuts down power consuming circuitries and reduces battery use. This behavior is known as Discontinuous Reception (DRX) in the existing GSM domain. When there is an incoming call for a particular mobile unit, or when a network (NW) wishes to establish a dedicated connection with a particular mobile unit, the NW encapsulates the identity of the mobile unit in the downlink paging message and send it across in the appropriate PCH block, as shown in FIG. 2. The concerned mobile unit reading all instances of its downlink paging messages will find its own identity in the message and start the process of accessing the NW using certain other standard protocol specifications. During other times, when the NW has not encapsulated the identity of the mobile unit in the paging message, the mobile unit can simply discard the message. However, such a discard only occurs after the mobile initially reads the message. Based on the preceding discussion, the importance and need of reading downlink paging messages should become apparent. Any attempt to lower the frequency of reading valid paging messages, to aid battery saving, comes with an adverse effect of missing incoming calls The decision-making process of lowering the reading frequency, and thereby skipping valid paging messages, is not a very well regarded process.

The present invention provides a deterministic and adaptive method of skipping valid paging messages, to aid a battery saving process, without causing any adverse impact on call performance by ensuring that no incoming calls are missed. The present invention further enables the battery-saving process to be implemented without any user intervention and without need of any specific time-interval to be set by a user when the user only expects a limited number of calls. By making it a continuous battery saving process, guided by new decision making methods, the method of the present invention enables the mobile unit to save a greater amount of battery life than the methods laid out in the prior art, further ensuring minimal incoming call misses, at the same time.

Figure 3:
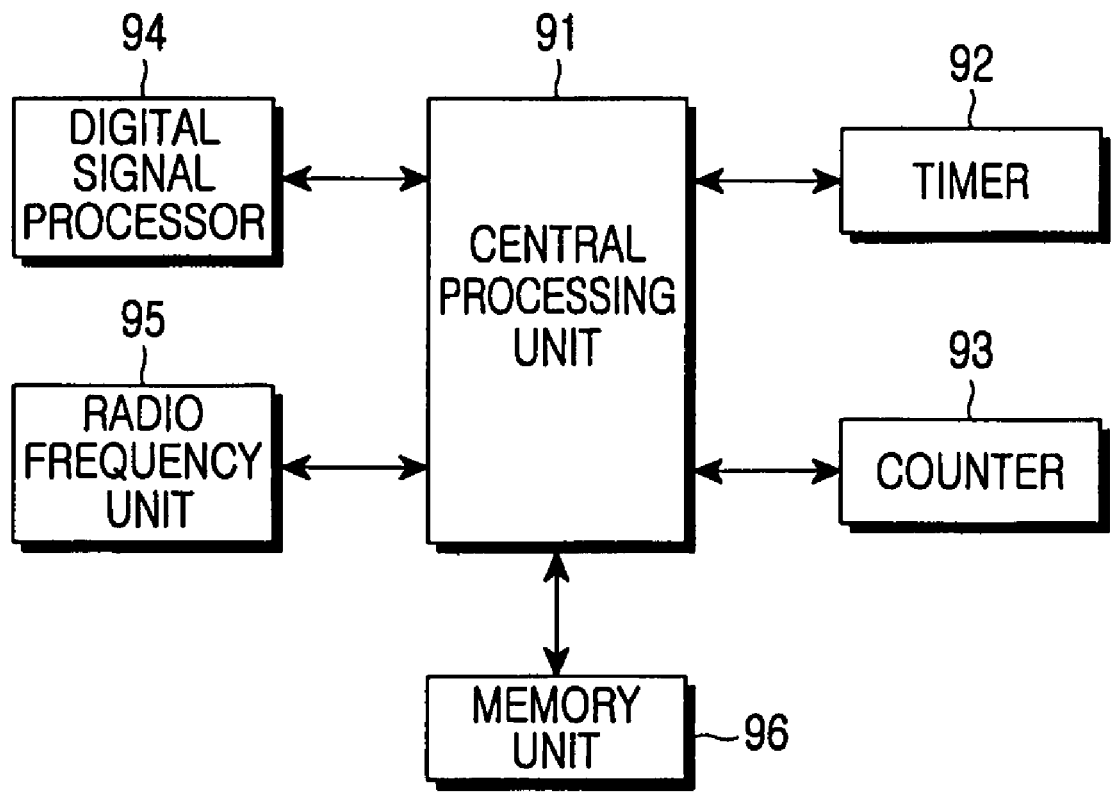
FIG. 3 is a view showing the configuration of a mobile device according to the present invention.

As shown in FIG. 3, a mobile unit for use with the present invention includes a central processing unit 91 to execute the software logic, a set of software timers 92, counters 93, flags to implement the method, a memory unit 96 including a volatile Random-Access Memory (RAM) or a non-volatile Read-Only Memory (ROM) to store the temporary data in digital format, a running software logic executing a given wireless communication protocol, GSM for example, a Digital Signal Processor (DSP) unit 94 to compute the air interface signal parameters and estimating the condition of the air interface environment, and a Radio Frequency (RF) unit 95.

The mobile unit utilizes a method to estimate, with sufficient degree of accuracy and without any additional aid of the NW, a maximum number of times the NW would send the notification for an incoming call before the NW gives up. A maximum notification repetition factor, per incoming call, is denoted as the MAX_PAGE_REPEAT_FACTOR. There are no techniques known in the prior art whereby the mobile unit could get the value of this factor as no wireless communication system transmits this information nor is any equation or method described by which the mobile unit could estimate the same with sufficient accuracy. According to the foregoing discussion, the mobile unit is able to calculate this factor autonomously by making use of an Equation (1) employing an already existing NW-transmitted parameter, BS_PA_MFRMS representing a paging periodicity, and finally provides the maximum possible value of the MAX_PAGE_REPEAT_FACTOR. The output of Equation (1) provides the upper limit of the page repeat factor, i.e., the maximum times the NW would send notification for an incoming call. Equation (1) can be represented as:

$$\text{MAX\_PAGE\_REPEAT\_FACTOR} = [(90 \text{ DIV } BS\_PA\_MFRMS) \text{ DIV } 4] \quad (1)$$

wherein "DIV" represents a normal integer mathematical division. Possible values of Equation (1), with a mention of the typical values, are elaborated in the sections that follow. While Equation (1) is written in light of a GSM communication system, a wireless communication system of a different access technology, having a different flavor of Equation (1) but finally achieving the same objective, as mentioned herein, is within the scope of the present invention.

The mobile unit reads one instance of a valid paging message and then skips a certain number of consecutive valid paging messages before re-reading a valid paging message. Presume a maximum number of valid paging messages which the mobile unit can skip, without compromising on call performance, is denoted by MAX_PAGE_SKIP_ATTEMPT. Obviously, this maximum possible page skips should always be less than the MAX_PAGE_REPEAT_FACTOR by 1 and can be represented by Equation (2):

$$\text{MAX\_PAGE\_SKIP\_ATTEMPT} = \text{MAX\_PAGE\_REPEAT\_FACTOR} - 1 \quad (2)$$

Also, presume an actual number of consecutive paging skip attempts, which the mobile unit actually utilizes to save battery life, is ACTUAL_SKIP_FACTOR. The mobile unit resorts to the normal specifications-driven behavior without any battery saving when the ACTUAL_SKIP_FACTOR acquires a value of 0. The mobile unit can set a value of this ACTUAL_SKIP_FACTOR in the following range: {0, MAX_PAGE_SKIP_ATTEMPT}. However, the actual value of the ACTUAL_SKIP_FACTOR is made so no opportunities exist whereby an incoming call is missed, and is also based on the desired extent of battery saving; the ACTUAL_SKIP_FACTOR value always falling into the range mentioned above and may otherwise be varied as desired. The present invention incorporates the deterministic element into the decision making process by ensuring that the value of MAX_PAGE_SKIP_ATTEMPT is always less than MAX_PAGE_REPEAT_FACTOR, evaluated from the Equation (2). This conditional check ensures that the mobile unit never skips pages more than the maximum number of times the NW transmits notifications for a single incoming call.

Additionally, to incorporate the feedback-control element into the battery saving process, the mobile unit stores the signal level, Received Signal Strength Indication (RSSI), and the signal quality, Signal to Noise Ratio (SNR), of the last received valid paging message. The last received RSSI and the last received SNR are denoted by LAST_RX_RSSI and LAST_RX_SNR, respectively. Furthermore, the mobile unit stores, in a volatile or a non-volatile storage medium implemented typically as a memory array inside the computer system of the mobile unit, the RSSI and the SNR of the past few samples wherein the mobile unit had read its valid paging messages. The sample size is denoted by MAX_SAMPLE_SIZE, the choice of which may be varied as desired. Given this sample size, the mobile unit, therefore, has RSSI and the SNR values of the past MAX_SAMPLE_SIZE paging messages, respectively. This storage of RSSI and SNR values of the past MAX_SAMPLE_SIZE paging messages will be over-written with new samples by discarding the oldest sample, every time a new paging message sample is read off the PCH. The last sample in this storage database corresponds to LAST_RX_RSSI and LAST_RX_SNR, as mentioned above.

Before every occurrence of a valid paging message, the mobile unit evaluates whether the LAST_RX_RSSI and the LAST_RX-SNR is above a comfort threshold MIN_RX_RSSI and MIN_RX_SNR, respectively. If the comparative evaluation indicates that the last received RSSI and the last received SNR is below the comfort minimum threshold, the output of this evaluation causes the battery saving process to turn off to ensure that not even a single valid paging message is skipped as external signal conditions are not in favor. The mobile unit reads the coming-up paging message, without any attempt to skip the same and continues to do so until conditions are in favor. On the other hand, when the comparative check indicates that the LAST_RX_RSSI and the LAST_RX_SNR are above the respective minimum comfort thresholds, a secondary check is made to analyze the stored RSSI and SNR values of the past MAX_SAMPLE_SIZE paging messages, and observe whether any continuous deterioration trend, or a negative slope, is found. This analysis helps in the prediction of imminent degradation of service quality from the serving cell. If a deterioration trend is found, the output of this evaluation causes the battery saving process to be turned off. The battery saving process remains turned off until the last received RSSI and the last received SNR are found above the respective comfort minimum threshold and, additionally, the RSSI/SNR data analysis of the past MAX_SAMPLE_SIZE paging messages indicate a positive slope. This evaluation step is invoked every time before the occurrence of a valid paging message. When this evaluation step indicates a "go-ahead", the mobile unit proceeds with the battery-saving process, subject to paging-skip rules indicated in the preceding method, making use of Equations (1) and (2).

The choice of the MIN_RX_RSSI and the MIN_RX_SNR may be varied as desired. Furthermore, the method to perform the RSSI/SNR data analysis of the past MAX_SAMPLE_SIZE paging messages may also be left to the skilled implementer. A generic process, however, is outlined in the foregoing discussion.

The rational behind Equations (1) and (2) and, subsequently, the general principles behind selection of certain values are described below. The NW parameter BS_PA_MFRMS can range from 2 through 9, as indicated in the protocol standards. A value of 2 implies that the valid paging message, for every mobile present in that cell, repeats every 2nd multi-frame or every 470 milliseconds [(51*2) frames*4.616 milliseconds per frame], whereas a value of 9 indicates the repetition every 9th multi-frame or every 2.11 seconds [(51*9) frames*4.616 milliseconds per frame]. Both the extremes are wrought with drawbacks; when the minimum value is used, the mobile unit hardly gets a chance to save battery life due to very frequent PCH reads thereby resulting in poor standby life and, conversely, when the maximum value is used, the battery gets saved to the maximum extent, but there is considerable delay between successive paging messages resulting in poor NW performance. The typical values used, as seen in most of the GSM networks, are 5, 6 and 7. The paging periodicity parameter, BS_PA_MFRMS, is 5 for the remainder of the discussion as an example. In step 103 of FIG. 4A, for example, the paging periodicity for a BS_PA_MFRMS is 5.

The rational behind Equations (1) and (2), in light of the GSM standards, is described below. The protocol standard enforces that the mobile unit maintain a counter, initialized to (90 DIV BS_PA_MFRMS). To those skilled in the related art, this counter is known as the Downlink Signaling Counter (DSC). It is mandated that every time the mobile unit fails to decode the paging message, the counter be decremented by 4 and at every successful decoding, be incremented by 1; however, never beyond the initial value of (90 DIV BS_PA_MFRMS). Furthermore, the specifications mandate that when the DSC counter ever drops down to 0 or below, the mobile unit must leave the current cell and attempt to move into a different cell by performing the cell reselection process. The fall of this counter to 0 is an indication that the service quality in the current cell has gone below acceptable limits. The present invention realizes the fact that a particular cell of the NW, in the event of notifying an incoming call, must transmit the notification a certain maximum number of times before giving up; however, this repetition of attempts is not told to the served mobile units and hence the present invention attempts to find it out autonomously, inside the mobile unit. This certain maximum number of times cannot be less than the tolerance amount which the wireless communication system has imposed on the mobile unit and to which the NW conforms. In this specific example, where '5' is used as the value of BS_PA_MFRMS, the DSC counter gets initialized to '18'. This enforces that the wireless communication system tolerates its constituent mobile units to have 4 (18−4*4=2) straight successive failures in decoding of the paging messages (i.e., before the DSC counter becomes less than 0) before expecting the mobile unit to move out of the current cell. Subject to this restriction, the cell of the NW transmits notification for an incoming call a maximum of 4 times continuously before giving up, as it is possible that the mobile unit fails to decode the first three instances of the paging messages, but succeeds on the fourth, and the final, decoding attempt and responds to the incoming call. This mobile unit, thereby, executes Equations (1) and (2) mentioned in the preceding sections, whereby it can estimate the maximum number of times the NW would send the notification continuously for a single incoming call. For this specific case of BS_PA_MFRMS as 5, MAX_PAGE_REPEAT_FACTOR can be calculated by Equation (3)

$$\text{MAX\_PAGE\_REPEAT\_FACTOR} = [(90 \text{ DIV } 5) \text{ DIV } 4] = \text{INTEGER}(4.5) = 4, \text{ by using Equation (2)}, \quad (3)$$

where the operator INTEGER extracts the integral value of the division. The maximum repetition attempts of notification to be employed by the NW, and the value for the maximum possible skip of the valid paging messages which the mobile unit can resort to, without affecting the MT-call performance in any way, can be determined by using Equation (4), $$\text{MAX\_PAGE\_SKIP\_ATTEMPT} = \text{MAX\_PAGE\_REPEAT\_FACTOR} - 1 = 3 \quad (4)$$

The ACTUAL_SKIP_FACTOR to be chosen for implementation can be selected, therefore, from the set given by {0, 3}, where 0 corresponds to the default specifications-driven behavior and 3 corresponds to the maximum possible skip attempts yielding the maximum amount of battery saving. Choice of ACTUAL_SKIP_FACTOR as 1 reduces the current consumption to nearly half, in the ideal cases. Any other value, above 1, causes the current consumption to drop down by more than or equal to 50 percent, in theoretical terms, thereby almost doubling the battery life. Furthermore, the range determination procedure ensures that not even a single MT-call is missed during the battery saving process. Typical ACTUAL_SKIP_FACTOR values suggested in the present invention may be 1, 2, or any other number. A value more than 2 increases battery life tremendously, but the probability of the call setup time becoming higher also increases, as is apparent to those skilled in the related art. In the other typical BS_PA_MFRMS values of 6, 7 and 8, the range can be {0, 2}, {0, 2}, {0, 1} respectively. The above deterministic approach provides an upper limit to the page-skipping attempts, based on the paging periodicity employed by the NW. A mobile unit employing a blind page-skipping procedure of three successive paging messages, as quite possible from the method in the prior art U.S. Pat. No. 6,628,972 B1, for a NW where the BS_PA_MFRMS is 6 or above, has an extremely high possibility of missing the MT-calls.

Also, in this specific example, the MAX_SAMPLE_SIZE is 5, although the choice is not restricted to this value. A curve can be constructed passing through the five discrete points and the slope can be determined. More number of samples results in a better estimation; but at the cost of increased complexity. The slope of the curve indicates the trend of the air interface; a negative slope indicating an imminent degradation and a positive or zero slope indicating acceptable conditions. The choice of the MIN_RX_RSSI and the MIN_RX_SNR is made in accordance with the RF unit sensitivity of the mobile unit, in conjunction with the reference sensitivities as laid out in the protocol specifications; such a procedure is apparent to those skilled in the related art.

Figure 4A:
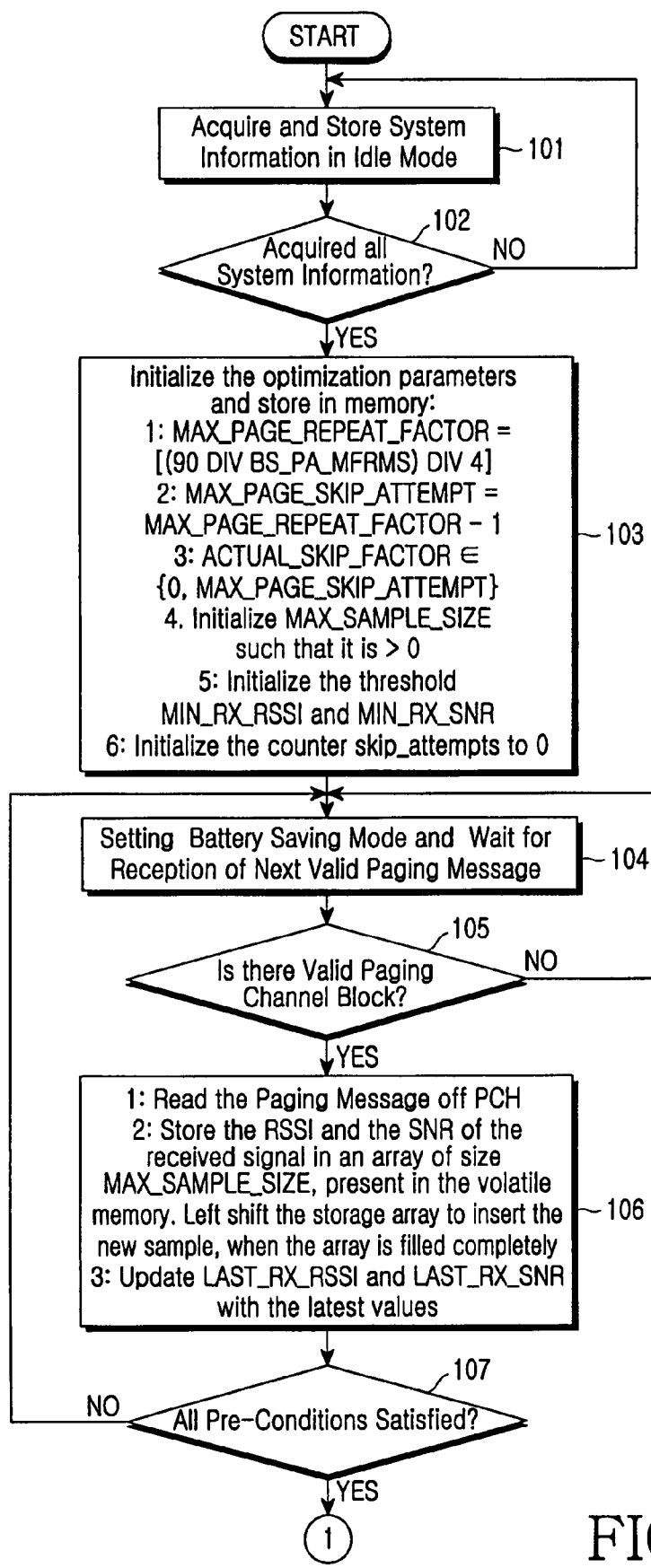
FIGS. 4A and 4B are flowcharts illustrating control procedure according to the present invention.
Figure 4B:
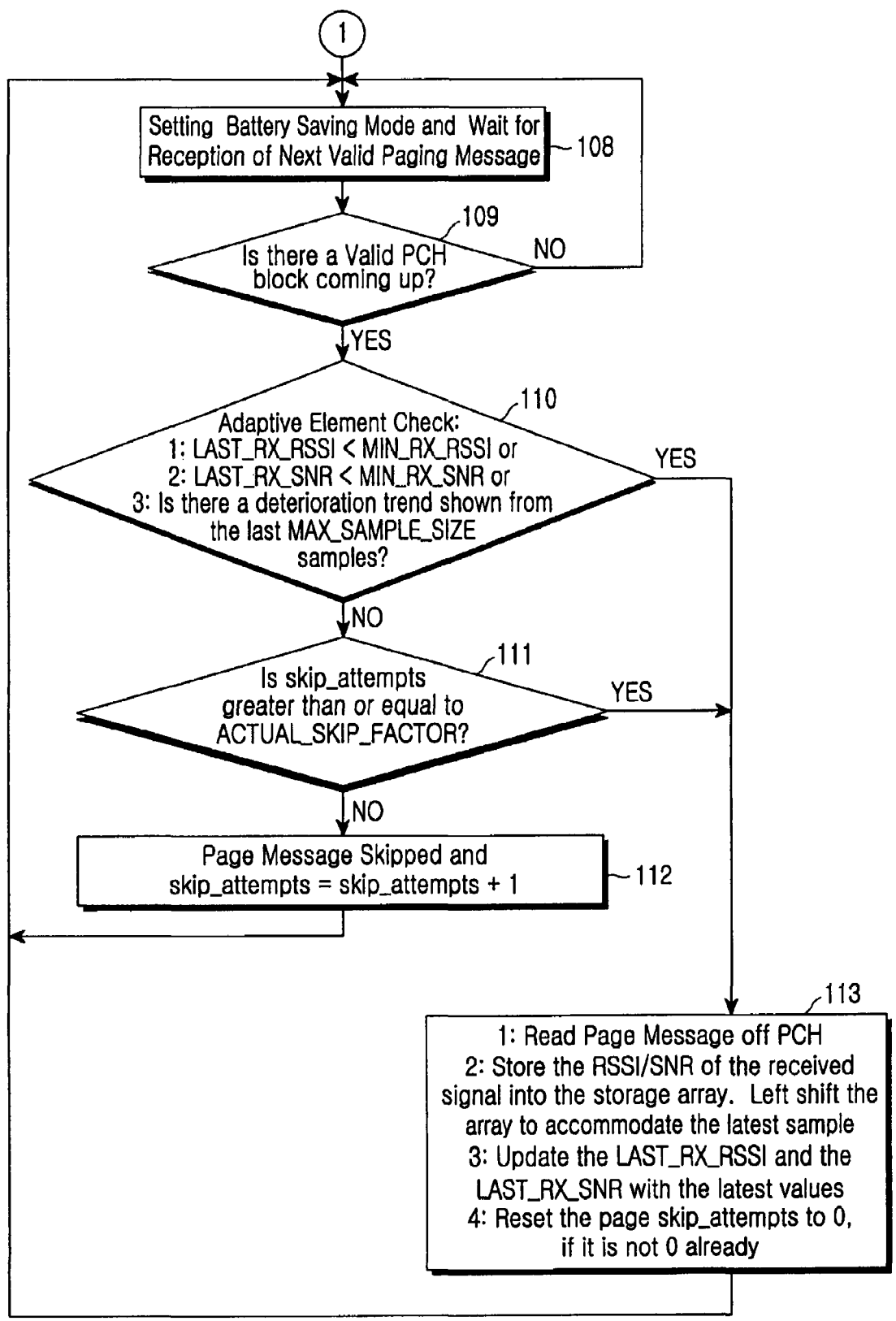

With the generic principles for selecting certain thresholds identified, the operation of the mobile unit is shown in FIGS. 4A and 4B. The mobile unit stays in the IDLE mode-Camped On state. In the idle mode, the mobile unit engages in reading the multitude of system information (SYSINFO), which the BTS of the serving cell of the network is transmitting via the downlink beacon frequency, alternately referred to as the Common Control Channel (CCCH). Among other information elements, one particular SYSINFO parameter enables the mobile unit to realize the paging interval period employed by the BTS. In the parlance of GSM, this paging interval period is identified by the parameter BS_PA_MFRMS. Then, the mobile unit checks if total system information is obtained, and repeatedly performs the operation of the step 101, if not, so as to effectively ensure that the mobile unit has read, at least once, all the transmitted SYSINFO parameters. Upon receiving the SYSINFO parameters, the mobile unit stores every SYSINFO elements into a memory unit 96, for future use. All these SYSINFO parameters are pertaining to a particular Base Transceiver Station (BTS). The mobile unit may be camped in the service region of a different BTS, or in a region in which two BTS simultaneously provide a service. Hence, the mobile unit, during the storing of the SYSINFO into the memory unit 96, stores the information tagged under the particular cell and maintains each such information block separately for unique BTSs. The mobile unit, during its stay in a particular cell, periodically updates the SYSINFO parameters to check if any of the information elements have changed and, if so, accordingly updates the same in the memory unit 96, wherein it had stored all instances of the information elements. The concept of periodic update of the SYSINFO parameter is an un-related discussion with respect to the present invention, as is apparent to those skilled in the related art, and hence, is not described.

Upon receiving all the SYSINFO parameters, the mobile unit proceeds to step 103, wherein the mobile unit prepares for the battery saving process by calculating all the optimization parameters, for example, MAX_PAGE_REPEAT_FACTOR, MAX_PAGE_SKIP_ATTEMPT, and ACTUAL_SKIP_FACTOR, in addition to initializing certain parameters employed in the present invention, for example, MAX_SAMPLE_SIZE, LAST_RX_RSSI, LAST_RX_SNR, MIN_RX_RSSI, MIN_RX_SNR, and SKIP_ATTEMPT_FACTOR. The mobile unit keeps a set of data storage variables including LAST_RX_RSSI and LAST_RX_SNR in the memory unit 96, to aid the battery-saving process. In step 103, the mobile unit executes Equations (1) and (2) to estimate the incoming-call notification repetition attempts, which the BTS employs. Once the repetition factor is known and stored for future use, the mobile unit evaluates the range of the page skip attempts and thereafter selects an appropriate value for the actual skip attempts which it would use, to save battery. For purposes of elucidation, the BS_PA_MFRMS is 5. The remainder of the optimization parameters, for example, MAX_PAGE_REPEAT_FACTOR and MAX_PAGE_SKIP_ATTEMPT, is calculated by Equations (1) and (2),

MAX_PAGE_REPEAT_FACTOR=
(90 DIV 5)DIV 4=4

MAX_PAGE_SKIP_ATTEMPT=
MAX_PAGE_REPEAT_FACTOR−1=3

Therefore, a deterministic range of the page skip attempts is {0, 3}. The ACTUAL_SKIP_FACTOR is a value which is contained in the set {0, 3}. For elucidation purposes, the ACTUAL_SKIP_FACTOR is chosen as 1, effectively implying that the paging messages is alternately read. All these calculated parameters are present as "data storing variables" in the memory unit 96 of the mobile unit. Further to initialization of the parameters which aid the deterministic aspect of the invention, the mobile unit now initializes the parameters, for example, LAST_RX_RSSI and LAST_RX_SNR, present as "data variables" in the memory unit 96 of the mobile unit, which aid the adaptive, signal-condition sensitive aspect of the invention. The MAX_SAMPLE_SIZE determines the size of the data storage element, typically implemented as a "memory array" in the computer system of the mobile unit. The array stores the RSSI and the SNR values of the received signal during reading of the paging messages off the PCH, over the last MAX_SAMPLE_SIZE paging message samples. Every time a new RSSI/SNR sample is received the array is updated with the same. Once the array gets filled up with MAX_SAMPLE_SIZE samples, newer samples are inserted, at the end of the array, by discarding the oldest sample and left shifting the entire array. Furthermore, the mobile unit sets a threshold minimum value for the RSSI and the SNR, i.e. MIN_RX_RSSI and MIN_RX_SNR, in advance. These two parameters, i.e. MIN_RX_RSSI and MIN_RX_SNR, are evaluated against the last received RSSI and the last received SNR, obtained from the last-read paging message, and are determined when the mobile unit continues with the battery-saving process. Lastly, the mobile maintains an integer counter 93, implemented as a "data variable" in the computer system of the mobile unit, to track the number of paging messages that have been skipped per session of battery-saving. This counter "skip_attempts" is initialized to 0.

Upon initialization of the optimization parameters, the mobile unit leaves the transitory state of step 103 and falls into the battery-saving state of step 104. This is the state which enables the mobile unit to save battery by allowing it to shut down most of its power-consuming circuitry like the RF unit 95, the DSP unit 94 and the central processor unit 91. The aim of any battery-saving process returns to this state as soon as possible and stay in this state as long as possible, according to the present invention. The only thing the mobile unit does, in step 101, is compute the next occurrence of the valid paging message by making use of the paging periodicity interval, obtained in step 101 and stored in the memory unit 96 as BS_PA_MFRMS, and it waits to receive the next valid page message during the calculated periodicity. After the calculated periodicity, in step 105, the mobile unit checks if the valid paging channel blocks exist in the received paging channel, and proceeds to step 106 if the valid paging channel blocks exist.

In step 106, the mobile unit readies the RF unit 95, the DSP unit 94 and all other associated circuitries so the mobile unit can successfully read the paging message off the PCH. Upon reading the paging message, the mobile unit evaluates if there is an incoming call notification intended for it. If found, the mobile unit leaves this IDLE mode—Camped ON state and tries to start a dedicated connection with the network. Those skilled in the related art know that the dedicated connection procedure is not germane to the present invention and can be skipped, without any impact on the brevity of the discussion. Assuming that there was no incoming call notification in the received paging message in the steps shown in FIGS. 4A and 4B according to the present invention. Furthermore, the mobile unit stores the RSSI and the SNR of the received signal as LAST_RX_RSSI and LAST_RX_SNR, and updates the first sample, including the LAST_RX_RSSI and the LAST_RX_SNR, into the storage array, whose size is given by MAX_SAMPLE_SIZE. The last sample entered into the storage array, of size MAX_SAMPLE_SIZE, would always be the LAST_RX_RSSI and the LAST_RX_SNR; two "data variables" which store the RSSI and the SNR of the last received signal.

In step 107, the mobile unit checks whether the operation of the step 106, i.e. all special pre-requisites for starting the battery-saving process, have been satisfied. A typical prerequisite, suggested in this discussion, is to ensure that the mobile unit has updated the storage array with at least a minimum of MAX_SAMPLE_SIZE samples before starting the optimization process. For a MAX_SAMPLE_SIZE value of 5, this conditional check ensures that the mobile unit has updated the storage array with 5 past samples of RSSI/SNR, before kick-starting the battery-saving process. Any other specific pre-requisite, conjured by the skilled implementer of the process, can be fitted into this conditional check. In step 107, if all pre-requisites are not satisfied, the mobile unit proceeds to step 104 to execute the battery-saving process and await the occurrence of the next paging message. On the next page occurrence, the mobile unit, once again, transitions to step 106 and read the paging message. Subsequently, the mobile unit updates the second RSSI/SNR sample into the second array location. The mobile unit, therefore, stores 5 samples into the array, whose size we have assumed to be 5. The snapshot of the array, at this stage, looks as follows:

Array [0].RSSI=RSSI of the 1st/least latest/first measured sample.
Array [0].SNR=SNR of the 1st/least latest/first measured sample.
Array [1].RSSI=RSSI of the 2nd sample.
Array [1].SNR=SNR of the 2nd sample.
Array [2].RSSI=RSSI of the 3rd sample.
Array [2].SNR=SNR of the 3rd sample.
Array [3].RSSI=RSSI of the 4th sample.
Array [3].SNR=SNR of the 4th sample.
Array [4].RSSI=RSSI of the 5th/most latest/last measured sample.
Array [4].SNR=SNR of the 5th/most latest/last measured sample.

Upon satisfying all the pre-requisites of the battery-saving process, the mobile unit can be seen to transition, via the connector, to step 108 of FIG. 4B. In step 108, similarly in step 104, the mobile device interrupts the operation of the RF unit 95, the CPU 91, and the DSP 94, and waits to receive the paging message of the next paging channel depending on the calculated periodicity according to the present invention. In step 109, the mobile unit checks if the paging message is to be received. If the paging message is not to be received, the mobile unit proceeds to step 108 and continues to save battery. However, if the paging message is to be received in step 109, the mobile unit, instead of directly reading the paging message as was shown in step 106, performs the adaptive, signal-condition sensitive check and evaluates if the battery optimization technique should be applied or not.

In step 110, therefore, the mobile unit evaluates whether the last received RSSI or the last received SNR, obtained from the storage array as the last stored elements Array [MAX_SAMPLE_SIZE-1].RSSI and Array [MAX_SAMPLE_SIZE-1].SNR, is less than MIN_RX_RSSI and MIN_RX_SNR respectively, as was initialized in step 103. Additionally the mobile unit analyzes the entire storage array, containing the past MAX_SAMPLE_SIZE samples and strives to evaluate any deterioration trend. The actual logic of analyzing the RSSI/SNR array is left to the implementer, skilled at the related art. If the last measured RSSI is less than the threshold or the last measured SNR is less than the threshold, the mobile unit proceeds to step 113. If the last RSSI and the last SNR are less than the preset threshold, i.e. MIN_RX_RSSI and MIN_RX_SNR, the mobile unit attempts to predict any imminent degradation of service by observing the presence of a negative slope or a deterioration trend in the past MAX_SAMPLE_SIZE samples. If any one of the three checks returns a TRUE result, the mobile unit jumps to step 113, without performing any battery saving by way of skipping page messages. In the operation of step 110, if the last RSSI and the last SNR are less than the MIN_RX_RSSI and the MIN_RX_SNR, or if the negative slope or the deterioration trend in the past MAX_SAMPLE_SIZE samples is observed, it is indicated that the mobile unit is roaming in a sub-optimal signal area. However, if the last RSSI and the last SNR are greater than the MIN_RX_RSSI and the MIN_RX_SNR and the negative slope or the deterioration trend is not observed in the past MAX_SAMPLE_SIZE samples, the mobile unit proceeds to step 111.

In step 111, it is indicated that the mobile unit can perform a battery saving by skipping a valid paging message. In this conditional check, the mobile unit makes the deterministic check to ensure that it does not skip more pages than necessary, as per the page skipping range {0, 3}, illustrated in this example. The mobile unit, therefore, checks if the actual "skip_attempts" has acquired a value equal to or greater than the ACTUAL_SKIP_FACTOR value, as selected in step 103. It needs to be noted that the "skip_attempts" was initialized to 0 in step 103. Since "skip_attempts" (0) is less than the ACTUAL_SKIP_FACTOR (1, as was chosen in this example), the mobile unit transitions from step 111 to the transitory step 112. In step 112, the mobile unit updates the "skip_attempts" by 1, increases and stores the number of paging message by 1, and proceeds to step 108. The mobile unit, at this point, had saved battery by skipping a valid paging message.

In step 108, the mobile unit awaits the occurrence of the next valid paging message, and proceeds to step 109. When the mobile unit identifies the existence of the valid paging channel blocks in step 109, it shifts to step 110 and performs the signal-condition checks once again. The verdict of this check will be the same as before, as there was no update of the storage array because of the page skip procedure. The mobile unit, therefore, immediately transitions to the conditional check step 111, where the mobile unit checks the "skip_attempts" against the ACTUAL_SKIP_FACTOR. This time, however, the mobile unit finds that the "skip_attempts" and the ACTUAL_SKIP_FACTOR both have acquired the same value of "1." Therefore, the mobile unit transitions to step 113.

In step 113, the mobile unit performs the same actions as in step 106. The mobile unit reads the page message off the PCH. At this time, according to the present invention, it is presumed that there was no incoming call notification. The mobile unit had already filled up all the MAX_SAMPLE_SIZE locations in the storage array with the past values. The mobile unit, therefore, discards the oldest sample, Array [0].RSSI and the Array [0].SNR values, left shifts the entire array to make the Array [MAX_SAMPLE_SIZE-1].RSSI and Array [MAX_SAMPLE_SIZE-1].SNR available and stores the latest sample, (MAX_SAMPLE_SIZE+1)th sample, into the array. The latest sample, just stored, is used to update the LAST_RX_RSSI and the LAST_RX_SNR variables also. A snapshot of the array of the memory unit 96, at this point, looks as follows, indicating that the last entry belongs to the 6th measured sample, as in this example:

Array [0].RSSI=RSSI of the 2nd measured sample.
Array [0].SNR=SNR of the 2nd measured sample.
Array [1].RSSI=RSSI of the 3rd measured sample.
Array [1].SNR=SNR of the 3rd measured sample.
Array [2].RSSI=RSSI of the 4th measured sample.
Array [2].SNR=SNR of the 4th measured sample.
Array [3].RSSI=RSSI of the 5th measured sample.
Array [3].SNR=SNR of the 5th measured sample.
Array [4].RSSI=RSSI of the 6h/most latest/last measured sample.
Array [4].SNR=SNR of the 6th/most latest/last measured sample.

Finally, step 113 resets the variable "skip_attempts" to 0, if it was not zero already. The variable "skip_attempts" had acquired the value "1" in the last page-skip procedure. Resetting this variable to 0 enables the re-use of this variable in the next page-skip attempt. Upon performing all the actions, the mobile unit transitions to step 108 and awaits the next valid page message occurrence.

When the next valid page message is due to occur, the mobile unit proceeds to step 110 through steps 108 and 109. In step 110, assuming that one of the three checks encounters a TRUE result, the mobile unit stops any attempt to save battery by skipping valid paging message and transitions to step 113 directly. In step 113, it reads the paging message and once again discards the oldest sample in the array; left shifts the entire array and updates the last element of the array with the received values. The "skip_attempts" being '0' already, the mobile unit does not update the variable.

The control flow having been described in its entirety, we now indicate a sample procedure of determining the negative slope or the deterioration trend. The SNR values of the past 5 samples are as follows:

Array [0].SNR=7×,
Array [1].SNR=8×,
Array [2].SNR=7×,
Array [3].SNR=6×,
Array [4].SNR=5×, where 'X' is presumed to be a proper dimension multiplicative constant. As known in prior art, the proper dimension of 'X' could be assumed to be in "dBm (millidecibels)", as known in the conventional art. The above data reveals a constant deteriorating trend or a constant negative slope from the last 4 samples, albeit the individual LAST_RX_SNR comparison against the MIN_RX_SNR might have indicated a FALSE result, if the MIN_RX_SNR was fixed at 3×. Similar arguments can be extended to the RSSI values, present in the array. This invention does not restrict the array analysis to the one mentioned above. Any implementer, skilled in the related art, could employ an alternate scheme for determining the trend, without digressing from the essential aspects of the invention.

It will also be obvious to those skilled in the art that other control methods and apparatus can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a microchip, microprocessor, handheld communication device, computer, rendering device or a multi function device.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

The following is a glossary of terms and definitions discussed in the present invention. The present invention is not limited to these terms and definitions as variations of the terms and definitions are possible and are apparent to those skilled in the art.

DRX: Discontinuous Reception. A technique employed in GSM wireless communication system whereby each mobile unit user is segregated into specific groups, containing several other mobile unit users. The NW broadcasts paging information, not for a particular user, but for all users in that group. The mobile units need not listen to all occurrences of Paging Channel Information blocks, instead only those which are intended for its group.

TDMA: Time Division Multiple Access. It is an access technology where a single radio frequency is time sliced, with each slice or slot given to a unique user. In GSM, the slice amount is 8 thereby enabling 8 users to be allowed into a single RF carrier. In GSM, the slot duration is 577 microseconds and the total frame duration, of 8 slots, is 4.616 milliseconds.

PCH: The Paging Channel. The NW broadcasts all incoming call notification in paging messages which are transmitted in information blocks contained in the logical paging channel.

CCCH: Common Control Channel. It is a logical set of channels which carries information common to all the served mobile units. Typically, system information, paging information etc are transmitted in this set of channels.

BTS: The Base Transceiver Station, which transmits the radio frequency waves that enable the wireless communication.

BSC: The Base Station Controller, which manages a group of BTS units in a given geographical area.

NW: The Fixed Network, including the BTS, BSC, MSC and all other elements which comprise the wireless communication system.

MAX_PAGE_REPEAT_FACTOR: The number of times the NW is going to send the incoming-call notification, inside the paging message for the particular mobile unit, before giving up.

MO/MT: Mobile-originated/Mobile-terminated call. An MT-call is successful if and only if the mobile unit successfully receives the intended notification message on its paging channel.

SCI: Slot Cycle Index. Used in CDMA based systems. The NW has more than one logical Paging Channels. The SCI determines which, out of the plurality of Paging Channels, will have the paging message intended for a mobile unit. SCI is a measure of the legitimate paging-message interval.

BS_PA_MFRMS: Used in GSM based systems. This parameter acquires a value from 2-9 and determines the periodicity of a legitimate paging message for any mobile unit in the system.

MAX_PAGE_SKIP_ATTEMPT: This parameter indicates the maximum number of contiguous paging messages that the mobile unit can skip without compromising on the MT-call performance.

ACTUAL_SKIP_FACTOR: This parameter indicates the actual number of contiguous paging messages that the mobile unit would skip, to save battery. The value of this factor should be within the range {0, MAX_PAGE_SKIP_ATTEMPT}.

DIV: Mathematical division of two operands. The result is shown in an integer format, omitting the fractional part.

The following are effects/advantages of the present invention.

The present invention saves standby-mode battery without compromising on the mobile unit's call performance.

Further, the present invention allows the mobile unit to perform the battery-saving continuously, thereby cumulatively increasing the standby time over a period of time, without any intervention of the mobile unit user. Hence, no specific time-interval dependent optimization is required.

The present invention performs NW-assisted battery saving in idle mode, and can also be standardized in the existing protocol specifications.

In addition, according to the present invention, due to the deterministic and adaptive nature of the process, phones can even double the battery life or even more, without a single miss of an MT-call.

What is claimed is:

1. A method for increasing the standby battery life of a mobile device, the method comprising the steps of:
   setting an actual skip factor (ACTUAL_SKIP_FACTOR) to be less than a maximum notification repeat factor (MAX_PAGE_REPEAT_FACTOR) of a valid paging message determined based on a paging period parameter; and
   skipping reception of the valid paging message by the ACTUAL_SKIP_FACTOR when a wireless environment condition satisfies a criterion, and setting a battery saving mode while a mobile terminal does not receive the valid paging message.

2. The method as claimed in claim 1, further comprising counting and storing a number of skipped receptions of the valid paging message, as SKIP_ATTEMPT_FACTOR.

3. The method as claimed in claim 2, further comprising releasing the battery saving mode at a time point when the valid message is received, receiving the valid message, and resetting the SKIP_ATTEMPT_FACTOR to 0 when the SKIP_ATTEMPT_FACTOR is equal to the ACTUAL_SKIP_FACTOR when the wireless environment condition satisfies the criterion.

4. The method as claimed in claim 3, further comprising releasing the battery saving mode and receiving the valid paging message, at a time point when the valid paging message is received, when the wireless environment condition does not satisfy the criterion.

5. The method as claimed in claim 4, wherein the MAX_PAGE_REPEAT_FACTOR denotes a number of times a network is going to send the valid paging message to the mobile device, and is defined by an equation,

MAS_PAGE_REPEAT_FACTOR=
   [(90 DIV BS_PA-MFRMS)DIV 4], wherein MAX_PAGE_REPEAT_FACTOR is a maximum number of page repeats, and BS_PA_MFRMS is a paging period parameter.

6. The method as claimed in claim 5, wherein a MAX_PAGE_SKIP_ATTEMPT, showing the maximum number of contiguous paging messages that the mobile unit can skip in a range of receiving an incoming-call, is calculated by an equation,

MAX_PAGE_SKIP_ATTEMPT=
   MAX_PAGE_REPEAT_FACTOR−1, in which MAX_PAGE_SKIP_ATTEMPT indicates a maximum number of page repeats, and wherein the ACTUAL_SKIP_FACTOR is one of sets defined by {0, MAX_PAGE_SKIP_ATTEMPT}.

7. The method as claimed in claim 6, wherein the wireless environment condition includes received Received Signal Strength Indicator (RSSI) and Signal to Noise Ratio (SNR), and the predetermined condition denotes the case that the received RSSI and SNR measured recently are greater than a minimum of received RSSI and SNR which are set in advance.

8. The method as claimed in claim 7, wherein the received RSSI and SNR are periodically measured, wherein the measured RSSI and SNR are stored during a predetermined term, and wherein the predetermined condition indicates the case that a result of comparing the stored RSSI and SNR in measured order does not show downstream characteristics.

9. The method as claimed in claim 8, wherein the measured RSSI and SNR are stored in a predetermined data size.

10. A method for increasing the standby battery life of a mobile device, the method comprising the steps of:
    obtaining and storing system information received from a network;
    calculating MAX_PAGE_REPEAT_FACTOR, MAX_PAGE_SKIP_ATTEMPT, and ACTUAL_SKIP_FACTOR, and initializing a maximum sample size, a minimum of the received Received Signal Strength Indicator (RSSI), a minimum of a received Signal to Noise Ratio (SNR), and SKIP_ATTEMPT;
    identifying a receiving period of a valid paging message using a paging period parameter included in the system information, performing a battery saving mode at a time when the valid paging message is not received, until a predetermined number of samples is stored, receiving the valid paging message to detect RSSI and SNR, storing the samples according to the maximum sample sizes, and storing the received RSSI and SNR, when a last valid paging message is received, as the last RSSI and SNR;
    comparing the last RSSI with a minimum of the received RSSI before a next valid paging message is received, to identify a downstream of a last sample; and
    maintaining the battery saving mode, skipping the next valid paging message, and increasing the SKIP_ATTEMPT by 1, when the last RSSI and SNR are greater than the minimum RSSI and SNR, there is no downstream, and the SKIP_ATTEMPT is less than the ACTUAL_SKIP_FACTOR.

11. The method as claimed in claim 10, wherein, in the step of increasing the SKIP_ATTEMPT, the battery saving mode is released, the next valid paging message is received and processed, the last RSSI and SNR are updated, and the SKIP_ATTEMPT is reset to 0, if the SKIP_ATTEMPT is greater than the ACTUAL_SKIP_FACTOR.

12. The method as claimed in claim 11, further comprising releasing the battery saving mode, receiving and processing the next valid paging message, and updating the last RSSI and SNR, when the last RSSI is less than the minimum of the RSSI.

13. The method as claimed in claim 12, further comprising receiving and processing the next valid paging message and updating the last RSSI and SNR, if the last SNR is less than the minimum of the SNR.

14. The method as claimed in claim 13, further comprising releasing the battery saving mode, receiving and processing the valid paging message, and updating the last RSSI an SNR, when the downstream exists.

15. The method as claimed in claim 14, wherein the MAX_PAGE_REPEAT_FACTOR denotes a number of times a network is going to send an incoming-call notification to the mobile device, and is defined by an equation,

MAS_PAGE_REPEAT_FACTOR=
   [(90 DIV BS_PA-MFRMS)DIV 4], wherein MAX_PAGE REPEAT FACTOR is a maximum number of page repeats, and BS_PA_MFRMS is a paging period parameter.

16. The method as claimed in claim 15, wherein a MAX_PAGE_SKIP_ATTEMPT indicates a maximum number of contiguous paging messages that the mobile unit can skip, in a range of receiving an incoming-call, and is calculated by an equation,

MAX_PAGE_SKIP_ATTEMPT=
   MAX_PAGE_REPEAT_FACTOR−1, wherein MAX_PAGE_SKIP_ATTEMPT indicates a maximum number of page repeats.

17. The method as claimed in claim 16, wherein the ACTUAL_SKIP_FACTOR is one of sets defined by {0, MAX_PAGE_SKIP_ATTEMPT}.

18. The method as claimed in claim 17, wherein a maximum sample size denotes a size of a sample including the received RSSI and SRN.

19. The method as claimed in claim 18, wherein, in the battery saving mode, a supply of electricity to a radio frequency unit, a central processing unit, and a digital signal processor of the mobile device is interrupted.

20. The method as claimed in claim 19, further comprising performing a dedicated connection to a network when a notification message of an incoming-call is included in the received valid paging message.

21. The method as claimed in claim 20, wherein an oldest sample is deleted when a sample is stored.

* * * * *